United States Patent Office 3,135,858
Patented June 2, 1964

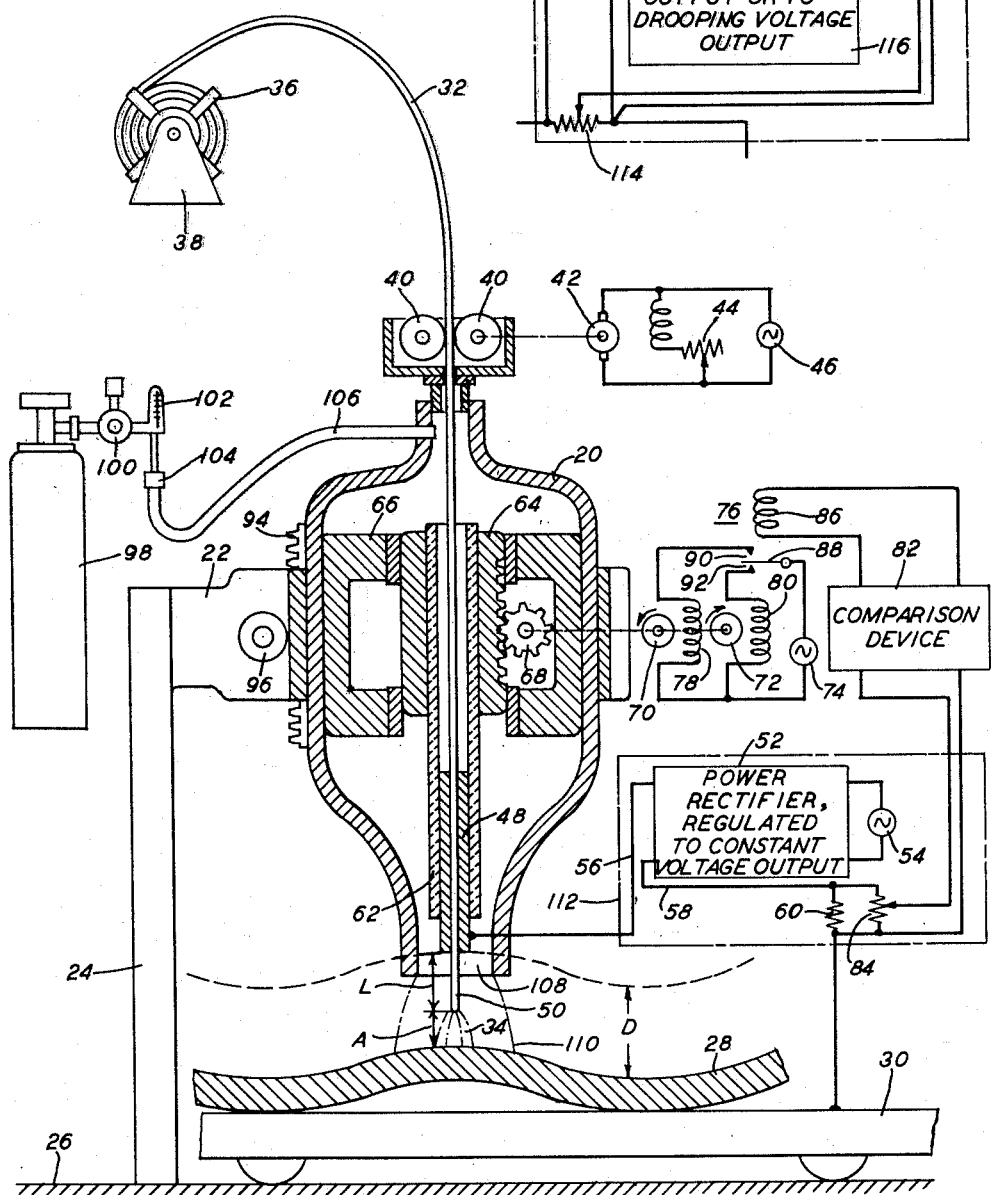

3,135,858
PRECISION ARC WELDING
Alexander Lesnewich, New Providence, N.J., assignor to Air Reduction Company, Incorporated, New York, N.Y., a corporation of New York
Filed Dec. 28, 1961, Ser. No. 162,757
3 Claims. (Cl. 219—130)

This invention relates to electric arc welding with a consumable electrode and more particularly to a method and apparatus for automatically controlling the process variables to obtain uniformly optimum welding results.

In consumable electrode arc welding and more particularly in gas shielded consumable electrode arc welding, the form and quality of the weld produced depends on a large number of process variables, including welding current, voltage, arc length and terminal length of electrode from current contact element to arc end. The terminal length of electrode is commonly referred to in the welding industry as "stick-out" and this term will be used hereinafter to mean such terminal portion of the electrode. If all of these variables could be held absolutely constant, the weld produced would of course be completely uniform. One commonly employed control system utilizes a wire feeding system that feeds wire at a rate proportional to arc voltage. Such a system may be employed where the welding power supply is of the drooping characteristic type, i.e., the voltage decreases as the current increases. In a system of this type if the spacing between the welding tool and the work decreases, the arc becomes shorter and the arc voltage lower. This results in a reduction of the wire feed rate and establishes a new equilibrium condition having different current, voltage and stick-out values from those that existed prior to the shortening of the welding tool-to-work distance. This change obviously results in some change in the weld produced.

In another popular form of consumable electrode welding control, a welding power supply is employed that maintains a substantially constant voltage output over its operating current range. In this type of welding system the electrode wire is fed at a constant rate independent of the welding process variables. In a system such as this, if the spacing between the welding tool and the workpiece is reduced, the current rises sharply to thereby increase the wire burn-off rate and to reestablish the equilibrium condition where the total welding voltage is the same as previously but the values of current, arc length and stickout are different from the values that existed prior to the change in spacing. Again a change in the weld produced must also result because the welding current, welding voltage, arc length and stick-out are all interrelated parameters. It is obviously impossible to maintain absolutely uniform conditions unless at least three of them are maintained constant.

Where the welding requirements are such that minor variations in the weld can be tolerated without adverse effect, it is sufficient to maintain the voltage constant as by either of the prior art systems referred to above. Considerable uniformity of product can also be obtained with systems such as these if by the nature of the weld-application or by extensive and careful jigging and job set-up controls, the spacing between the welding tool and the work is maintained at a fixed value. This however, has proved to be an impractical approach to the problem where precision welding is required. In the fabrication of large welded assemblies at economic production rates, it is impractical if not impossible, to avoid changes in the spacing between the welding tool and the work surface.

It is accordingly the object of my invention to provide a method and apparatus for consumable electrode electric arc welding wherein the welding current, voltage, arc length and electrode stick-out are maintained constant irrespective of any changes in spacing between the welding tool and the surface of the work to be welded.

I have discovered that substantially complete control of all critical variables of a welding device employing a consumable electrode is obtainable by using the combination of a constant-voltage power supply, a constant-speed feeding device for the consumable electrode, and a means for maintaining the current constant by automatically adjusting the relative position of the workpiece and the holder of the consumable electrode in response to fluctuations in the arc current. I have found that adjustment of the work to contact tube distance to maintain constant current results in the maintenance of a constant arc length and constant stick-out, and hence a uniform weld. I have also found that substantially equivalent results may be obtained in an arrangement that is similar to the first arrangement but uses a constant current supply source and maintains arc voltage constant by controlling the relative position of the workpiece and the holder of the consumable electrode in response to fluctuations in the arc voltage. A third satisfactory arrangement uses a power source with a drooping volt-ampere characteristic and controls the relative position of the workpiece and the holder of the consumable electrode in response to fluctuations in the arc voltage or arc current with preference given to which of these is the more sensitive to changes in the said relative position. Such a system is operable because of the predetermined relationship between current and voltage for any given setting of the machine. Similarly this invention may be used with a power source having a rising volt-ampere characteristic where, because of the relatively flat characteristic curve of such a machine, the contact tube to work spacing is preferably controlled to maintain constant current. If voltage fluctuations are used as the spacing signal source, the spacing must of course respond in the opposite direction with a rising volt-ampere supply from the direction of response with a drooping volt-ampere supply.

Other features, objects and advantages will appear from the following more detailed description of illustrative embodiments of the invention, which will now be given in conjunction with the accompanying drawings.

In the drawings:

FIG. 6 is an elevational view, partly in section and partly schematic, showing an illustrative embodiment of the invention; and FIG. 7 is a schematic diagram showing a modification of a portion of FIG. 6 within a dot-dash line in FIG. 6.

Figure 1:
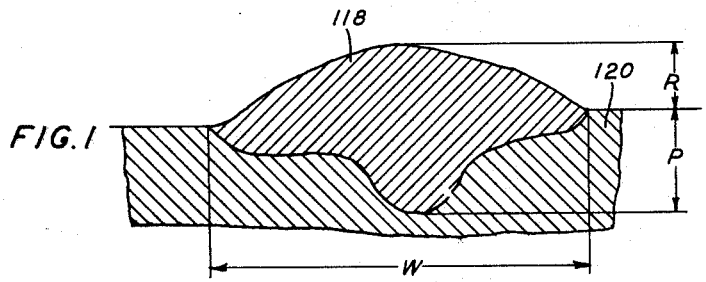
FIGS. 1–5 are diagrammatical cross-sections of weld beads illustrating the effects of various welding conditions upon the shape of cross-section.

The changes in arc current, arc length, and wire-feed speed required to maintain a constant arc voltage while welding on a contoured work piece will generally cause large variations in the shape and penetration of the weld. Examples of such variations are shown diagrammatically in FIGS. 1–5. In these figures, the cross-section of the weld bead is designated 118 and the adjoining metal body is designated 120. The figures are based upon examination of cut-away cross-sections of actual welds. The main variable properties observed are described as depth of penetration and width and depth of seam reinforcement. FIG. 1 shows how these properties are defined. Depth P of penetration is the distance from the original surface of the workpiece to the bottom tip of the weld. Width W of reinforcement is the width of the weld, and depth R of reinforcement is the distance from the original surface of the workpiece to the top of the mound of material constituting the weld.

FIG. 1 shows the reference condition of the weld for comparison with the conditions shown in FIGS. 2–5. The weld in FIG. 1 was made in mild steel with an arc length A (FIG. 6) of 3/16 inch and a separation D of 15/16 inch between workpiece and contact tube. The wire 32 was fed into the arc at a constant linear rate of 180 inches per minute. For this weld the penetration P and reinforcement dimensions W and R are considered satisfactory. Shielding gas composed of argon plus one percent of oxygen was used. With the given arc length of 3/16 inch, the arc required 27 volts and 330 amperes, using 1/16 inch diameter mild steel welding wire. To maintain the arc length constant, the wire-feed speed of 180 inches per minute was required.

Figure 2:
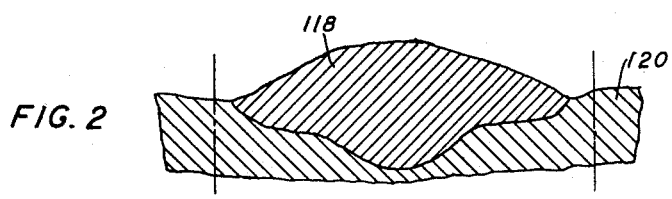

For the first comparison, a welding power source with a drooping characteristic relation of current to voltage was employed. The separation D was deliberately changed from 15/16 inch to 11/16 inch. The wire-feed speed was automatically changed by the welding machine in such amount as to restore the arc voltage to its original value with the possibility that thereby the arc length might also be restored to its original value. The result was that the wire-speed changed from 180 inches per minute to 160 inches per minute, which did not in fact restore the arc length to its original value of 3/16 inch but resulted in a new arc length of 1/4 inch. The new condition required 350 amperes arc current instead of the original 330 amperes. The penetration P and the reinforcement R decreased from the optimum, as shown in FIG. 2.

Figure 3:
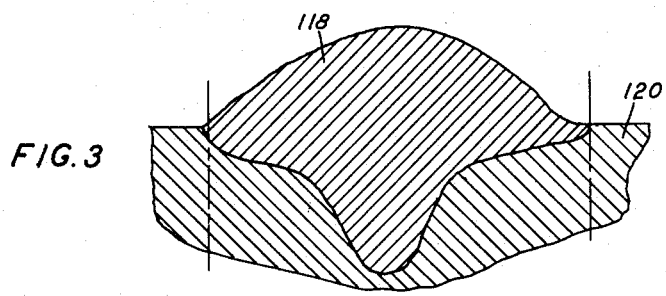

In the next case, that shown in FIG. 3, the separation D was deliberately increased from 15/16 to 13/16 inches. This caused the wire-feed speed to increase to 245 inches per minute and the arc current to increase to 370 amperes. As shown in FIG. 3, the penetration P and reinforcement R both increased. The new values of P and R are both greater than wanted.

Figure 4:
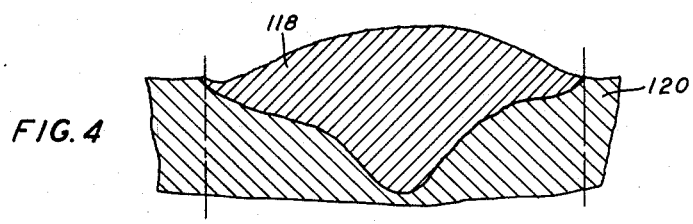
Figure 5:
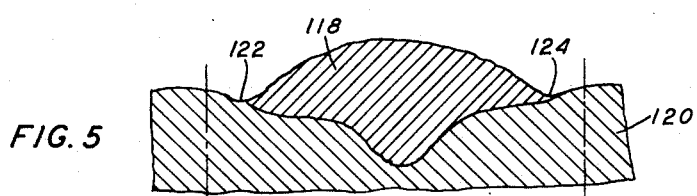

FIGS. 4 and 5 show results obtained with a constant voltage power supply and constant wire-feed speed. With the same comparison condition as shown in FIG. 1, the separation D was deliberately changed as before. The reduced separation to 11/16 inch from 13/16 inch raised the arc current from 330 amperes to 350 amperes and shortened the arc from 3/16 inch to 1/8 inch. There was only a slight increase in penetration as shown in FIG. 4. On the other hand, a deliberate increase in separation D from 15/16 inch to 13/16 inches reduced the arc current from 330 amperes to 315 amperes and increased the arc length from 3/16 inch to 1/4 inch. The penetration P was reduced to an unsatisfactory value and undercutting was produced as shown at 122 and 124 in FIG. 5.

In FIGS. 2–5, the peculiarities of the shapes of the weld cross-sections have been slightly exaggerated in order to bring out more clearly the nature of the observed differences in penetration and reinforcement, inasmuch as small variations not readily evident upon inspection may make the difference between satisfactory and unsatisfactory welds.

By comparison the effectiveness of the control scheme of the present invention was demonstrated by test welding runs made under conditions in which the position of the workpiece was varied relatively to a fixed support. The contact tube of the welding machine was arranged so that the contact tube could be held at a fixed distance from the support as a reference condition, or could be automatically positioned to maintain a preselected parameter such as current or voltage constant. In these tests a constant-voltage power supply was used throughout and the wire-feed rate was maintained constant at 145 inches per minute. The welding conditions were established to produce an arc in an argon shield, having a length of 3/16 inch with a welding current of 270 amperes at the midpoint spacing of 15/16 inch. The arc voltage was 31 volts. In the reference case, the distance between the contact tube and the workpiece varied from 7/16 inch to 1½ inches, giving an average separation of about 15/16 inch. Voltage and current measurements were made with recording meters as well as with more rapidly responding indicating meters. In the reference case, with these conditions of test and a fixed location of the contact tube, the arc current varied from 310 amperes to 240 amperes as the distance from the contact tube to the workpiece varied from 7/16 inch to 1½ inches. The weld bead in the reference case was found to vary in manner similar to the variations shown in FIGS. 2–5 but with even greater variations due to the fact that during the test the arc current passed through its transition value from spray to drop transfer at the lower end of the current range.

The test runs taken while the distance between the contact tube and the workpiece was controlled in response to arc current variations so as to maintain substantially constant arc current showed that the arc current remained between 270 amperes and 280 amperes while the control was in effect, and the separation remained in the range between 15/16 inch and one inch. The weld bead cross-section under these conditions was found to be similar in shape to that illustrated in FIG. 1 and very uniform along the length of the seam, and it was found that all the essential welding variables remained substantially fixed.

Referring to FIG. 6, an illustrative embodiment of the invention is shown comprising a welding machine having a barrel 20 supported on a bracket 22 from a post 24 mounted upon a base 26. A workpiece 28, which may have a contour which is not flat, is arranged to be conveyed to the welding region upon a conductive conveyor 30. The welding electrode is of the consumable type and is illustrated as a wire 32, which is assumed to be of suitable composition for the purpose.

The wire electrode 32 is arranged to be fed into the welding region at a substantially constant linear rate forming during operation an arc 34 between the wire 32 and the workpiece 28 which latter is in electrical contact with the conveyor 30. The wire 32 is stored upon a reel 36 supported in a bracket 38 and is propelled by feed rolls 40 driven by an adjustable speed motor 42. The speed of the motor 42 may be set to a desired substantially constant value by means of a rheostat 44. The motor may be driven from any suitable power source illustrated for simplicity of description as a generator 46. The wire 32 passes through the barrel 20 where it is guided by a contact tube 48 which supports the wire by frictional engagement as it approaches close to the arc 34 and makes electrical contact between a welding current circuit to be described and a protruding portion 50 of the wire 32 extending between the tip of the contact tube 48 and the arc 34. The portion 50 of the wire 32 is electrically heated by resistance heating performed by the passage therethrough of the welding current, the rate of heat delivery to the wire depending upon the length L of wire protruding, commonly called the "stick-out," and the square of the welding current I. The welding current in turn depends upon the stick-out and the arc length A. The sum $$D = L + A$$

is the distance between the workpiece 28 and the tip of the contact tube 48. The melting rate of the wire is $$aI + bLI^2$$

where $a$ and $b$ are constants of proportionality. In the usual case, the term $aI$ is small in comparison with the other term, which means that the melting rate is substantially proportional to the rate of electrical heating of the wire over the length L. At all times, the arc length A rapidly adjusts to the linear feed rate of the wire to establish an equilibrium condition in which the arc current is of such value that the melting rate equals the linear rate at which the wire is fed into the arc.

The welding current in the embodiment shown in FIG. 6 is supplied from any suitable constant voltage source, which is illustrated in block form in the figure as a power rectifier 52 that is regulated in any suitable known manner to maintain a constant voltage output. The rectifier 52 is supplied with alternating current input as by a generator 54. One output lead 56 from the rectifier 52 is connected directly to the contact tube 48 and the other output lead 58 is connected to the conveyor 30 by way of a current measuring resistor 60. The welding current circuit is completed from the conveyor 30 through the workpiece 28, the arc 34, and the protruding portion 50 of the wire 32 to the contact tube 48.

Provision is made for varying the position of the contact tube 48 with respect to the barrel 20 in such manner as to maintain the distance D substantially constant as the workpiece 28 with its variable contour is conveyed through the welding region. For this purpose, the contact tube 48 is attached to an insulating tube 62 which is in turn attached to a hollow cylindrical rack member 64 slidably mounted in a guide member 66 attached to the inner surface of the barrel 20. A pinion 68 is mounted upon the member 66 and may be rotated in either direction as by a pair of stepping motors 70 and 72 working on a single shaft that drives the pinion 68 either directly or through reducing gears.

The stepping motors 70 and 72 are arranged to be actuated selectively one at a time by power from a generator 74 connected by means of a relay 76 either to an operating winding 78 of motor 70 or to an operating winding 80 of motor 72. The relay 76, in turn, is controlled by a comparison device 82 in response to changes in welding current, which changes reflect changes in distance D.

The welding current changes appear as changes in voltage across the current measuring resistor 60. A suitable portion of voltage across the resistor 60 (commonly referred to as a shunt) may be selected by means of a potentiometer 84 connected in parallel with the resistor 60. The voltage selected by the potentiometer 84 is impressed upon the comparison device 82. The device 82 is of known type wherein an impressed voltage is continually compared with a reference voltage and an output current is produced which depends in direction upon which is greater, the reference voltage or the impressed voltage with which the reference voltage is compared. The current produced by the comparison device 82 is applied to the winding 86 of the relay 76 to throw the tongue 88 of the relay either to contact 90 or to contact 92 depending upon the direction of the current produced. When the tongue 88 rests on contact 90 the source 74 drives the motor 70 and through a ratchet device moves the rack 64 and contact tube 48 downward, say. When the tongue 88 rests on the contact 92, the rack 64 and contact tube 48 are then driven upward, also through a ratchet device. As long as the voltages compared in device 82 are nearly equal, there is no current produced in winding 86 and the relay 76 is so arranged that when there is no current in the winding 86 the tongue 88 remains between the contacts 90 and 92 without touching either contact. In this state, neither motor is driven and by virtue of the ratchet devices the rack 64 and the contact tube 48 remain in whatever position they were left when the pinion 68 last stopped moving.

To accommodate the welding machine to different thicknesses of workpiece, the barrel 20 is made adjustable in position by means of a rack 94 which may be driven by a pinion (not shown) which is manually adjustable by means of a knob 96 mounted on the bracket 22.

Gas for shielding the arc 34 may be supplied from a gas storage cylinder 98 through a pressure reducing valve 100, a flow meter 102, a control valve 104, and a hose 106 to the interior of the barrel 20 where it passes out through a nozzle 108 to form a shielding mass the approximate limits of which are indicated at 110 surrounding the arc 34.

FIG. 7 shows how the portion of the system of FIG. 6 within the dot-dash line 112 may be altered to form certain alternative embodiments of the system. The resistor 60 and potentiometer 84 of FIG. 6 are replaced by a potentiometer 114 which is connected across the arc 34 and so measures the arc voltage instead of the arc current. The constant voltage source 52 is replaced by a source 116 which is either regulated to constant current output or to drooping voltage output. As in FIG. 6, the voltage derived from the measuring element, in this case element 114, is compared with a reference voltage in the comparison device 82 and the result is used to control the relay 76 and thus to maintain the distance D substantially constant.

The power rectifiers 52 and 116 may be of the general type disclosed in the application of William J. Greene, Serial No. 51,107, filed August 20, 1960, and entitled "Function Controlled Welding Supply," by means of which the voltage-current characteristic may be made to be either constant voltage, constant current, drooping voltage, rising voltage, or of other desired form.

In case the source 116 has a drooping characteristic, greater sensitivity may in some cases be obtained by using the current measuring resistor 60 as shown in FIG. 6 in place of the voltage measuring resistor 114 as shown in FIG. 7.

One type of null-seeking polarized differential relay suitable for use as the relay 76 herein is disclosed in U.S. Patent No. 2,443,784, issued June 22, 1948, to C. V. Bullen and C. J. Anderson, relays of which type are commercially available.

One type of motor suitable for use as motors 70 and 72 herein is disclosed in U.S. Patent No. 2,834,896, issued May 13, 1958, to C. P. Fisher, and motors of this type are commercially available.

One type of comparison device suitable for use as device 82 herein is disclosed in a copending application of N. E. Anderson, Serial No. 23,201, filed April 19, 1960, assigned to the same assignee as the present application.

While illustrative forms of apparatus and methods in accordance with the invention have been described and shown herein, it will be understood that numerous changes may be made without departing from the general principles and scope of the invention.

What is claimed is:

1. The method of controlling an electric arc welding process employing a consumable electrode emerging from an electrical contact member adjacent to the arc, and a workpiece, which method comprises the steps of feeding the consumable electrode into the arc at a substantially constant linear rate, energizing the arc from a power source, regulating said power source to substantially constant voltage output, detecting variations in arc current, and varying the position of the said contact member in accordance with the sensed current variations to maintain the distance between the point of emergence of said electrode from said contact member and the surface of the workpiece substantially constant.

2. In an automatically controlled electric arc welding system, in combination, a consumable electrode, means for feeding said electrode toward the arc at a substantially constant linear rate, means for making an electrical contact with said electrode at a point thereof separated by a variable distance from the arc to determine a welding current carrying portion of said electrode between the said point of contact and the arc, means for supporting a workpiece in spaced relation to said electrode, means for producing relative motion between said electrode and said workpiece in a direction substantially parallel to the surface of said workpiece, a regulated power source connected through the workpiece, the arc, and said current carrying portion of said electrode, said power source being regulated to substantially constant voltage output, and means responsive to variations in arc current for regulating said point of contact with said electrode to maintain a substantially constant distance between said point of contact and the workpiece over a varying contour of the workpiece.

3. In an automatically controlled electric arc welding system, in combination, a consumable electrode, means for feeding said electrode into the arc at a substantially constant linear rate, a conductive contact member frictionally engaging said moving electrode to make electrical contact therewith and to determine a length of said moving electrode through which welding current passes between said contact member and the arc, a workpiece supporting member, means for producing relative motion in the direction of the weld between said electrode and a workpiece supported on said workpiece supporting member, a power source regulated to substantially constant voltage output and connected through the workpiece, the arc, and said current carrying portion of said moving electrode, means to vary the position of said contact member with reference to said workpiece supporting and conveying member, and means responsive to variations in arc current for regulating said position varying means to maintain a substantially constant distance between said contact member and the workpiece over a varying contour of the workpiece.

References Cited in the file of this patent

UNITED STATES PATENTS 2,897,341     MacKusick _____ July 28, 1959